United States Patent
McDonald et al.

(10) Patent No.: US 10,929,322 B2
(45) Date of Patent: Feb. 23, 2021

(54) PRIORITIZED ARBITRATION USING FIXED PRIORITY ARBITER

(71) Applicant: Hewlett Packard Enterprise Development LP, Houston, TX (US)

(72) Inventors: Nicholas George McDonald, Ft. Collins, CO (US); Darel Neal Emmot, Wellington, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 76 days.

(21) Appl. No.: 16/147,404

(22) Filed: Sep. 28, 2018

(65) Prior Publication Data

US 2020/0104271 A1    Apr. 2, 2020

(51) Int. Cl.
G06F 13/364    (2006.01)
G06F 13/22    (2006.01)
G06F 13/366    (2006.01)

(52) U.S. Cl.
CPC .......... *G06F 13/364* (2013.01); *G06F 13/225* (2013.01); *G06F 13/366* (2013.01)

(58) Field of Classification Search
CPC .................................................... G06F 13/364
USPC ......................................................... 710/244
See application file for complete search history.

(56) References Cited

U.S. PATENT DOCUMENTS

| | | | |
|---|---|---|---|
| 4,953,081 A | 8/1990 | Feal et al. | |
| 5,519,837 A * | 5/1996 | Tran ...................... | G06F 13/364 370/462 |
| 6,032,218 A * | 2/2000 | Lewin ................. | H04L 12/5602 710/111 |
| 6,205,524 B1 * | 3/2001 | Ng ......................... | G06F 13/161 345/541 |
| 6,445,680 B1 | 9/2002 | Moyal | |
| 6,516,369 B1 * | 2/2003 | Bredin ................. | G06F 13/364 370/448 |
| 6,629,176 B1 * | 9/2003 | Rhee ..................... | G06F 13/362 710/100 |
| 7,814,253 B2 | 10/2010 | Kethareswaran et al. | |
| 7,882,292 B1 | 2/2011 | Van Dyke et al. | |

(Continued)

FOREIGN PATENT DOCUMENTS

GB    2372916 A    9/2002
JP    07-013877 A    1/1995

OTHER PUBLICATIONS

XILINX; "OPB Arbiter (v1.02e)"; (Research Paper): Product Specification; Sep. 23, 2005; 36 pages.

(Continued)

*Primary Examiner* — Titus Wong
(74) *Attorney, Agent, or Firm* — Hewlett Packard Enterprise Patent Department

(57) ABSTRACT

An arbiter may include a plurality of cells, mapping logic, a fixed priority arbiter, and unmapping logic. Each cell may be associated with a corresponding client and configured to store a priority for the corresponding client. The mapping logic may be connected to the plurality of cells to order requests received from the clients according to the priorities stored in the cells. The fixed priority arbiter may receive the ordered requests and generate a grant for a winning request of the requests. The unmapping logic may use the stored priorities to yield the grant back to the winning client that sent the winning request.

7 Claims, 5 Drawing Sheets

(56) References Cited

U.S. PATENT DOCUMENTS

| | | | |
|---|---|---|---|
| 8,667,200 | B1 | 3/2014 | Muliadi et al. |
| 2003/0225737 | A1* | 12/2003 | Mathews ............ H04L 12/5601 |
| 2003/0233503 | A1 | 12/2003 | Yang et al. |
| 2008/0256279 | A1 | 10/2008 | Kethareswaran et al. |

OTHER PUBLICATIONS

Search Report and Written Opinion received for PCT Application No. PCT/US2019/053730, dated Jan. 17, 2020, 9 pages.

* cited by examiner

PRIORITIZED ARBITRATION USING FIXED PRIORITY ARBITER

BACKGROUND

Modern application specific integrated circuits (ASICs) (especially router or switch ASICs) utilize arbiters for regulating access to shared resources. A router ASIC might have many tens of arbiters instantiated on the chip. The latency and area of arbiter designs are meticulously scrutinized for applicability in ASICs.

BRIEF DESCRIPTION OF THE DRAWINGS

Certain examples are described in the following detailed description and in reference to the drawings, in which.

DETAILED DESCRIPTION OF SPECIFIC EXAMPLES

A fixed priority arbiter (FPA) has n inputs to receive requests from clients and n outputs to provide grant signals back to the clients. A fixed priority arbiter strictly prioritizes the inputs. The first active input receives the grant. For example, if the first input is active then the first output will provide a grant; if the first input is not active, but the second input is, then the second output will provide a grant. FPA is not often used in practice because of unfairness. Starvation may occur to lower-prioritized clients.

Least recently used (LRU) arbitration utilizes an ordered list of clients. The client at the head of the list has the highest priority. When giving out a grant, the LRU arbiter starts at the head of the list and scans until it finds a client with an active request. It supplies the grant to that client and puts the client receiving the grant to the back of the list. LRU is often a desirable arbitration scheme for providing fair access to share resources. However, latency and area considerations prevent its utilization in ASICs.

Implementations of the disclosed technology provide an arbitration system utilizing a fixed priority arbiter that can be adapted to various arbitration schemes, such as LRU. Each client contending for resources is associated with a priority value. Requests received from the clients are ordered and provided to the fixed priority arbiter according to the clients' priorities. The fixed priority arbiter outputs a grant for the first active input. The grant is then mapped back to the appropriate client according to the client's priorities. The client priorities are then updated according to the configured arbitration scheme.

Figure 1:
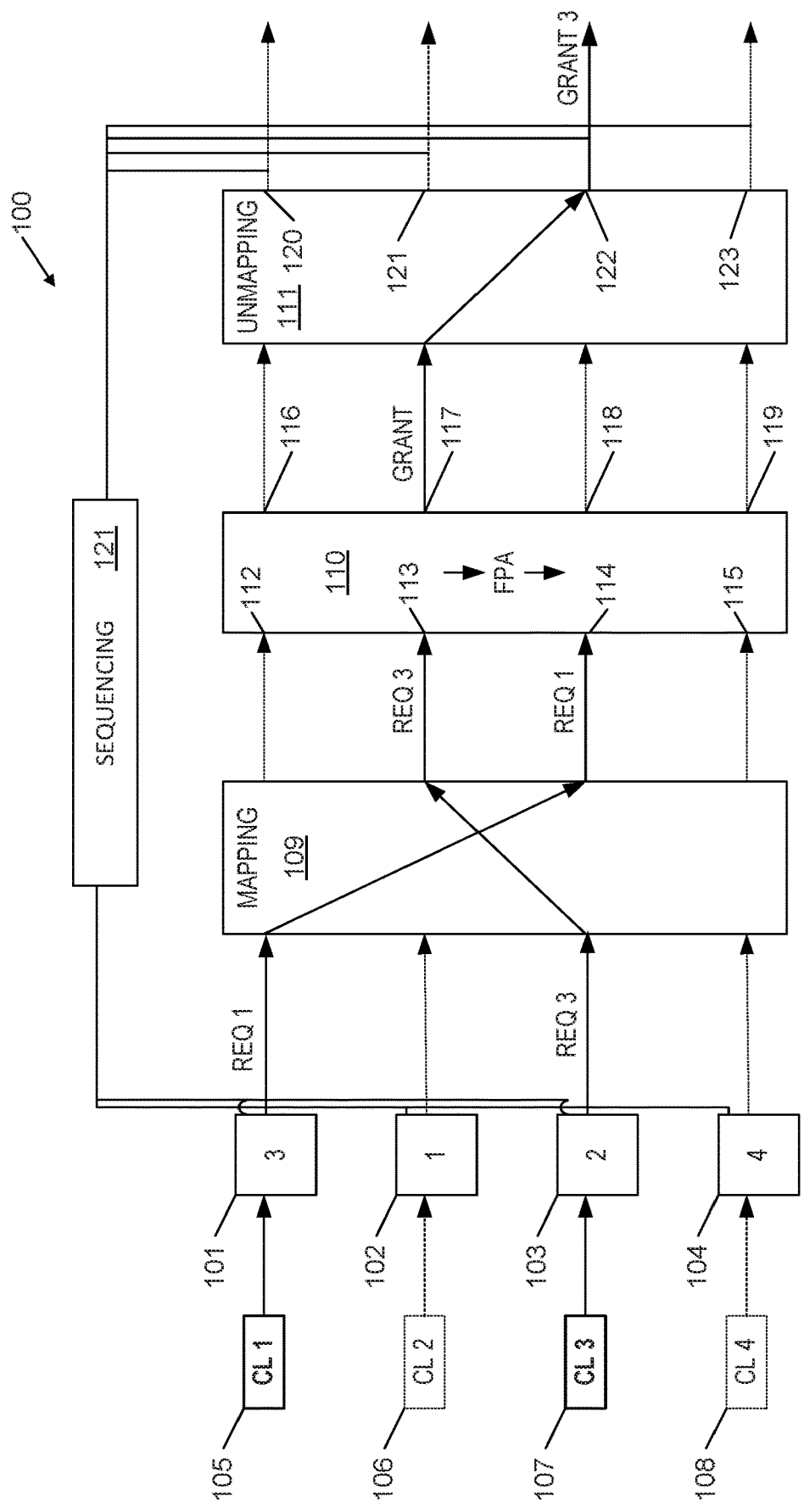
FIG. 1 illustrates an example arbiter utilizing client priorities, mapping logic, a fixed priority arbiter (FPA), and unmapping logic.

FIG. 1 illustrates an example arbiter utilizing client priorities, mapping logic, a fixed priority arbiter (FPA), and unmapping logic. For example, the illustrated arbiter logic may be implemented as hardware (for example as circuitry in an ASIC or connections in a field programmable gate array (FPGA)), as software or firmware stored on a non-transitory computer readable medium and executed by a processor, or as a combination thereof.

The arbiter 100 includes a plurality of cells 101-104. Each cell is associated with a corresponding client 105-108 and is configured to store a priority for the corresponding client. The clients are elements of a device, or devices themselves, that are in contention for a shared resource. For example, the clients may be input ports or message queues of a network switch that are contending for access to an output port. As other examples, the clients may be input ports contending for access to a port of a cross bar, or message queues contending for access to routing tables, or components generating memory transactions that contend for access to a shared memory channel.

In the illustrated implementation, cell 101 is associated with client 1 105, cell 102 is associated with client 2 106, cell 103 is associated with client 3 107, and cell 104 is associated with client 4 108. The priority values determine the priority ordering of the clients. Accordingly, in FIG. 1, the order of the clients is {CL 2 106, CL 3 107, CL 1 105, CL 4 108}. In this example, the ordering may be a strict ordering, where no two clients share the same priority. In the illustrated example, the priorities values may take on any value from 4 to 1, with 1 being the highest priority and 4 being the lowest priority. However, in other implementations, the priorities may be mapped to other values. For example, an implementation may utilize 4 as the highest priority and 1 as the lowest priority.

The arbiter 100 further includes mapping logic 109. The mapping logic is connected to the plurality of cells 101-104 and orders requests received from the clients according to the pluralities stored in the cells. In the illustrated example, solid line connections indicate connections with active signals (such as request or grants), dotted lines connections are inactive connections. Accordingly, in the illustrated example, client 1 105 has issued a request REQ 1 and client 3 107 has issued a request REQ 3, while the other two clients do not have current requests. The mapping logic shuffles the requests to the input port of the fixed priority arbiter 110 that corresponds to the associated client priority. In other words, a request with priority i is mapped to the ith input port of the FPA 110. In the illustrated example, REQ 1 has a priority equal to 3 and is mapped to the third input port 114 of the FPA by the mapping logic 109. Similarly, REQ 3 from client 3 107 has a priority equal to 2 and is mapped to the second input 113 of the FPA 110. I The arbiter 100 further includes the fixed priority arbiter 110. The FPA is to receive the ordered requests and to generate a grant for a winning request of the requests. For example, the FPA may have a plurality of inputs 112-115 equal in number to the plurality of cells 101-104. The FPA has an equal number of outputs 116-120. As indicated by the downward arrows, the FPA prioritizes the inputs in the following order {112, 113, 114, 115} and outputs a grant on the output 116-119 corresponding to the highest asserted input. The FPA receives the requests after they are ordered by the mapping logic 109. Accordingly, in the illustrated example, REQ 3 is received on the second port 113 and REQ 1 is received on the third input port 114. Neither client 2 106 nor client 4 108 have issued a request, so no request is provided to the first and fourth input ports 112, 115. In this example, the FPA 110 issues a grant for the winning request REQ 3 on its second output port 117.

The arbiter 100 further includes unmapping logic 111. The unmapping logic is used to yield the grant back to the winning client that sent the winning request. The unmapping logic 111 may determine which output port the grant was issued on, and use the stored priorities to identify which client had the priority corresponding to the grant output port. In the illustrated example, the FPA issued a grant on its second output port 117, which corresponds to the client having a priority equal to 2. The unmapping logic 111 uses the set of stored priorities to determine that client 3 107 had the priority equal to 2. Accordingly, the unmapping logic 111 maps the grant to the third client. In the illustrated implementation, the unmapping logic 111 comprises a plurality of output ports 120-123 corresponding to the plurality of clients. The unmapping logic 111 yields the grant back to the winning client by providing the grant on the output corresponding to the winning client. In the illustrated example, the unmapping logic 111 yields the grant to winning client 3 107 by outputting GRANT 3 on the third output.

The arbiter 100 further comprises sequencing logic 121 to update the client priorities stored in the cells 101-104 according to the ordering scheme being implemented. For example, to implement LRU ordering, the sequencing logic 121 may update the priorities stored in the cells such that the cell corresponding to the winning client is updated to a lowest priority and each cell previously storing a priority less than a winning priority is updated to an incrementally higher priority, wherein the winning priority is the priority of the cell corresponding to the winning client. In the illustrated example, the winning priority is 2, so cell 103's priority is set to the lowest priority 4, cell 101's priority is incremented from 3 to 2, and cell 104's priority is incremented from 4 to 3. Cell 102's priority is greater than the winning priority, so its priority is left unchanged.

In some examples, the sequencing logic 121 is distributed throughout the cells 101-104. For example, each cell may receive the winning priority value and may updates its priority based on its current priority and the winning priority. In other implementations, the sequencing logic 121 is separate from the cells 101-104. For example, the sequencing logic 121 may track the cells' priorities and the winning priority. The sequencing logic 121 may send update signals to the cells that will have their priorities updated. For example, the sequencing logic 121 may send a reset signal to the cell storing the winning priority (cell 3 103 in the illustrated example), the reset signal causing the cell to update its priority to the lowest priority (4 in the illustrated example). As another example, the sequencing logic 121 may send an increment signal to the cells having a lower priority than the winning priority (cells 1 101 and 4 104 in the illustrated example).

Figure 2A:
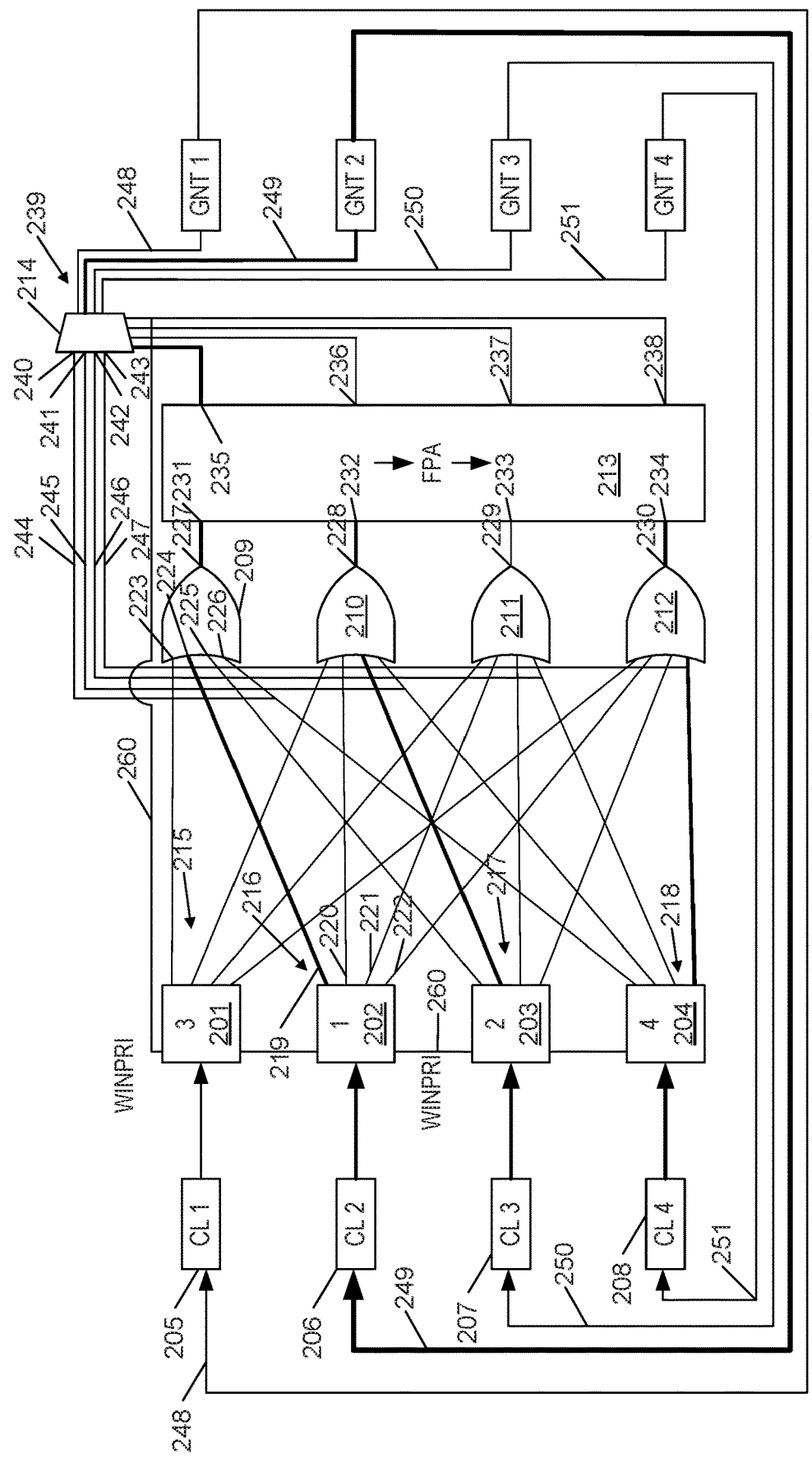
FIG. 2A illustrates an example implementation of an arbiter.

FIG. 2A illustrates an example implementation of an arbiter. For example, the arbiter of FIG. 2A may be an implementation of an arbiter 100 of FIG. 1.

The arbiter includes a plurality of cells 201-204. Each of the cells 201-204 is connected to an associated client 205-206. In the illustrated example, cell 201 is connected to and associated with client 1 205, cell 202 is connected and associated with client 2 206, cell 203 is connected to and associated with client 3 207, and cell 204 is connected to and associated with client 4 208. Although the arbiter is illustrated with four cells and clients, implementations in practice may have a greater or fewer number of clients. For example, an implementations may have 32 or 64 clients contending for access to the shared resource.

Each cell 201-204 stores a priority for its corresponding client. The priority determines the order of precedence for the clients to access the shared resource should they issue a request for the resource. In the illustrated example, the order of precedence is {CL 2, CL 3, CL 1, CL 4}. In other words, if client 2 206 issues a request, it will be yielded a grant.

The arbiter further comprises mapping logic connected to the plurality of cells to order requests received from the clients according to the priorities stored in the cells. In this embodiment, the mapping logic comprises a plurality of OR gates 209-212 and a plurality of sets of output lines 215-218. Each of the cells 201-204 comprises a plurality of output lines 215-218. Each plurality of output lines 215-218 is equal in number to the number of cells 201-204 and in number to the number of OR gates 209-212. In the illustrated example, each of the four cells comprises four output lines. The ith output line of each cell is connected to the ith OR gate. In other words, the first output line of each cell is connected to the first OR gate 209, the second output line of each cell is connected to the second OR gate 210 and so on.

Each cell outputs its stored priority as a one hot encoded signal onto its plurality of output lines if it receives a request from its corresponding client. In the illustration, a line having an asserted signal has a thicker weight than a line without an asserted signal. Accordingly, in the example, client 2 206, client 3 207, and client 4 208 have issued a request to their corresponding cells 202-204, while client 1 205 has not issued a request. Each cell one-hot encodes its stored priority by asserting a logical '1' on its output line that corresponds to the priority value, with the other lines left inactive. In other words, a priority value of k is output by the cell by asserting a logical '1' on its kth output line, while leaving the remaining lines as logical '0'. For example, cell 202 outputs its priority value of 1 one hot encoded as 1000 by bringing output line 219 high while leaving output lines 220, 221, and 222 low. Similarly, cell 3 203 outputs its priority value of 2 one hot encoded as 0100 by outputting a 1 on its second output line, and cell 4 204 outputs its priority value of 4 one hot encoded as 0001. Cell 1 201, which did not receive a request from its corresponding client 1 205, does not output any priority value, or, equivalently, may be considered to output a null value of 0000.

The mapping logic further comprises the plurality of OR gates 209-212. The number of OR gates 209-212 is equal in number to the plurality of cells 201-204. Each OR gate comprises a plurality of input ports equal in number to the plurality of cells. For example, OR gate 209 comprises input ports 223, 224, 225, and 226. As discussed above, each input port of each OR gate is connected to an output line of the plurality of cells, such that the ith output line of each cell is connected to the ith OR gate. Each OR gate 209-212 comprises an output 227-230. The FPA 213 comprises a plurality of inputs 231-234 equal in number to the plurality of cells 201-204. The inputs 231-234 are ordered in priority as discussed with respect to FPA 110 of FIG. 1. The outputs of the OR gates are connected to the inputs of the fixed priority arbiter in order. The output of ith OR gate is connected to the ith input of the fixed priority arbiter. In the illustrated example, output 227 of the first OR gate 209 is connected to the first input 231 of FPA 213, output 228 of the second OR gate 228 is connected to the second input 232 of FPA 213, and so on.

Each OR gate 209-212 outputs a request signal if there is a 1 on any of its inputs. Additionally, each cell's ith output line is connected to the ith OR gate. Accordingly, if the cell storing a priority value of i receives a request, then one of the inputs to the ith OR gate will be true and the ith OR gate's output will be true as well. For example, in the illustration, the first OR gate 209 is active because cell 2 202 received a request and had a priority of 1. If, instead, the third cell had priority 1, the first OR gate would still be active, because the input 225 would be a logical 1. In the illustrated situation, OR gates 209, 210, and 212 output request signals because the cells having priorities 1, 2, and 4 are each active.

The fixed priority arbiter 213 comprises a plurality of outputs 235-238 equal in number to the plurality of cells 201-204. Each output 235-238 corresponds to one input 231-234. The FPA 213 outputs a grant on the output 235-238 corresponding to the highest requested input 231-234. Accordingly, the winning priority value is one hot encoded onto the set of outputs. In the illustrated example, the FPA 213's output is 1000, which is the one-hot encoding for the priority value equal to 1.

Figure 2B:
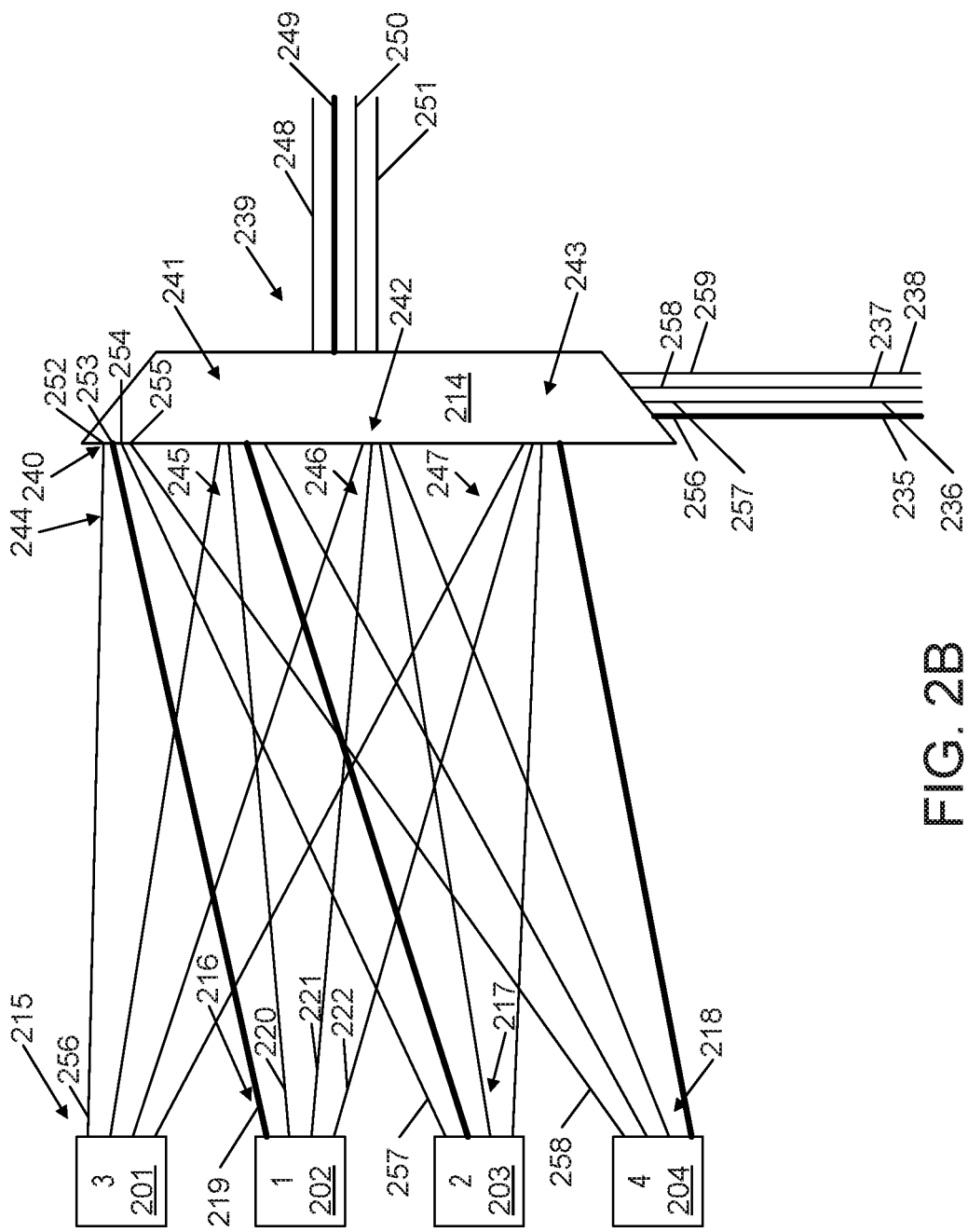
FIG. 2B illustrates the multiplexer and connections of FIG. 2A in greater detail.

The arbiter further comprises unmapping logic to use the stored priorities to yield the grant back to the winning client that sent the winning request. In the illustrated example, the unmapping logic comprises a multiplexer (mux) 214. The mux 214 comprises a plurality of inputs 240-244 equal in number to the number of cells. Each input 240-243 comprises a plurality of input lines equal in number to the plurality of cells. FIG. 2B illustrates the specific lines and connections represented by elements 240-247 in FIG. 2A.

As illustrated in FIG. 2B, each input 240-244 comprises four input lines. The output lines of the cells 201-204 are connected to the input lines such that the ith output line of the jth cell is connected to the jth input line of the ith multiplexer input. For example, the first mux input 240 comprises input lines 252-255. The first output line 256 of the first cell 201 is connected to the first input line 252 of the first input 240. The first output line 219 of the second cell 202 is connected to the second input line 243 of the first input 240. The first output line 257 of the third cell 203 is connected to the third input line 254 of the first input 240. Finally, the first output line 258 of the fourth cell 204 is connected to the fourth input line 255 of the first input 240.

Each input k 240-243 one hot encodes the identity of the cell having the priority value k. As discussed above, in the illustrated example, each cell 201-204 one hot encodes its stored priority onto its output lines if it receives a request from its corresponding client. Additionally, in the illustrated example, each priority value is unique. Accordingly, assuming requests are received, for a priority value k a single cell will output a logical 1 on its kth output line, and each other cell will output a logical 0 on their kth output lines. Each of these kth output lines are connected to the input lines of the kth input, in the cell order. Accordingly, the kth input one hot encodes the identity of the cell that output the priority value k. In the illustrated example, input 1 240 has 0100, which one hot encodes decimal 2 and identifies cell 202; input 241 is 0010, which encodes and identifies cell 3 203; input 242 is 0000 or null because cell 1 201 did not receive a request from its corresponding client; and input 243 is 0001, which encodes and identifies cell 4 204.

The mux 214 further comprises an output 239 and a plurality of select lines 256-259. The output comprises a plurality of output lines 248-251 equal in number to the number of cells 201-204. The plurality of select lines 256-259 are connected to the plurality of outputs 235-238 of the fixed priority arbiter 213 such that the outputs 235-238 of the fixed priority arbiter one-hot encode which multiplexer input 240-243 is copied to the multiplexer output 239. As discussed above, the active output 235-238 of the FPA 213 corresponds to the priority value of the cell corresponding to the winning requester. If the kth output of the FPA 213 is active, then the requester corresponding to the cell having priority value k has won the grant. Additionally, the identity of that cell (and corresponding client) is one hot encoded on the kth input 240-243 of the mux 214. Accordingly, by copying the kth input 240-243 to the output 239, the mux 214 outputs the identity of the winning cell. In the illustrated example, the select lines 256-259 are 1000, which one-hot encodes the winning priority value of 1 and selects the first input 240 to be copied to the output 239. The output lines 248-251 of the mux 214 are therefore 0100, which one hot encodes that the second client 206 is the winning requester.

Returning to FIG. 2A, each output line 248-251 of the mux 214 is connected to one of the clients. The ith output line 248-251 is connected to the ith client 205-208. In the illustrated example, the first output line 248 is connected to the first client 204, the second output line 249 is connected to the second client 206, the third output line 250 is connected to the third client 207, and the fourth output line 251 is connected to the fourth client 208. The grant is carried on the output line 248-251 connected to the winning client. As discussed above, the identity of the winning client is one hot encoded on the output 239 of the mux 214. In other words, the ith line of the output 239 will be high if the ith client is the grant winner, and will be low otherwise. The ith output line is connected to the ith client. Accordingly, if the ith client is the winning client, it will see its grant line 249-251 high, and the other clients will see their grant lines low. The active output line 248-251 therefore carries the grant to the winning client. In the illustrated example, the second output line 249 is high, which yields the grant to the contended resource to winning client 2 206.

The arbiter further includes sequencing logic to update the priorities stored in the cells according the ordering scheme being applied in the system. For example, in an LRU priority scheme, the winning client in one round becomes the lowest priority client for the next round. Any clients with higher priorities then the winning client that did not send a request retain their priorities unchanged. Clients with lower priorities are updated to the next higher priority for the next round. In the illustrated example, each cell 201-204 comprises a portion of the sequencing logic. Each cell 201-204 is to update its priority based on its current priority and the winning priority. The outputs of the FPA 213 are provided to the cells on channel 260. Channel 260 is an n line channel, where n is the number of cells and where the ith line carries the signal of the ith output 235-238. For example, channel 260 may be a bus connected to the outputs of the FPA 213 and the cells 201-204. As discussed above, the outputs 235-238 one-hot encode the winning priority value. Accordingly, channel 260 carries one hot encoded winning priority value to the cells 201-204.

After the FPA 213 selects the winning priority value, the cells 201-204 receive this winning value and use it to update their priorities. Each cell compares its current priority value to the winning priority value. If the cell's priority is equal to the winning priority (i.e., if the cell's corresponding requester just won the grant), then the cell updates its priority value to the lowest priority value. If the cell's priority is lower than the winning priority (i.e., if its stored value is greater than the winning value), then the cell incrementally increases its priority to the next value. For example, the cell may left shift its one hot encoded priority value to update it to the next highest value. If the cell's priority is higher than the winning value, the cell leaves its priority value unchanged. In the illustrated example, channel 260 carries the signal 1000 to each of the cells. Cell 201 has priority value 3, so updates its priority value to 2 for the next round; for example, by left shifting 0010 to 0100. Cell 202 has priority value 1, so sets is priority value to 4; for example, by left shifting 1000 to 0001. Cell 203 has priority value 2, so sets is priority value to 1; for example, by left shifting 0100 to 1000. Finally, cell 204 has priority value 4, so sets its priority value to 3; for example, by left shifting 0001 to 0010. After updating the cell priorities, the arbiter continues to the next grant round using the updated priority values.

Figure 3:
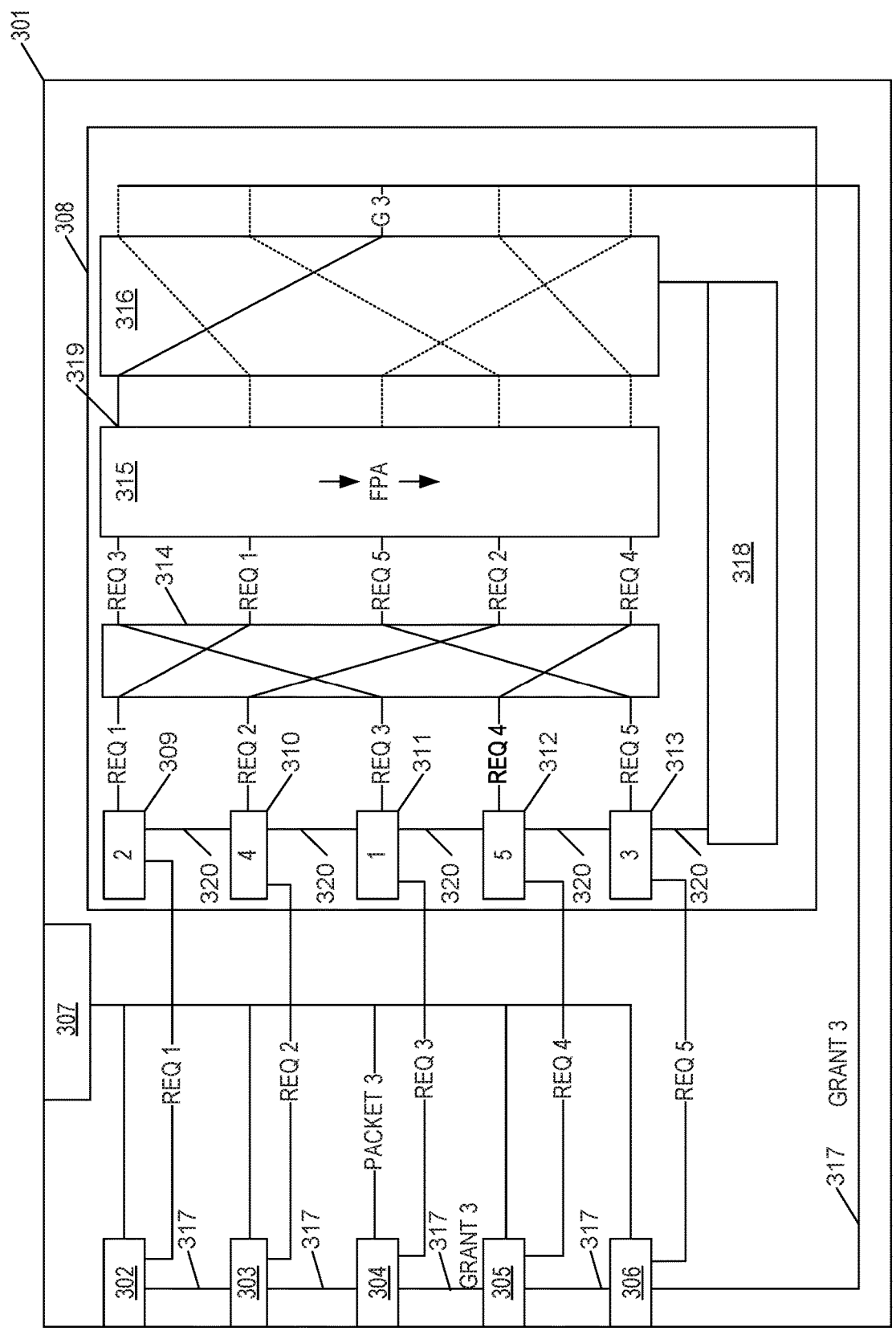
FIG. 3 illustrates a system including a plurality of clients contending for access to a resource and an arbiter to grant access to the resource.

FIG. 3 illustrates a system 301 including a plurality of clients 302-306 contending for access to a resource 307 and an arbiter 308 to grant access to the resource 307. For example, the clients 302-306 may be input ports to a network switch 301 contending for access to an output port 307. In the illustrated example, each client 302-306 issues a request to the arbiter 308 access the shared resource 307.

The arbiter 308 controls access to the resource 307 by receiving requests for the resource 307 from the clients 302-306 and provides a grant to the resource to a winning client 304 of the clients 302-306. In this example, the arbiter 308 is an arbiter as described with respect to FIG. 1. For example, the arbiter 308 may be implemented as described with respect to FIGS. 2A and 2B.

The arbiter 308 comprises a plurality of cells 309-313. Each of cells 309-313 stores a priority to access the resource 307 for a corresponding client 302-306. For example, in the illustrated state, the prioritized order of the clients is {client 3 311, client 1 302, client 5 306, client 2 303, client 4 305}. Accordingly, cells 309-313 store priority values {2, 4, 1, 5, 3} to reflect this order of the clients.

The arbiter 308 further comprises mapping logic 314 connected to the plurality of cells to order requests received from the clients according to the priorities stored in the cells. For example, the mapping logic 314 may operate as described with respect to mapping logic 109 of FIG. 1. More specifically, the mapping logic 314 may operate as described with respect to the mapping logic of FIG. 2A. In the illustrate example, the mapping logic 314 permutes {REQ 1, REQ 2, REQ 3, REQ 4, REQ 5} according to the priorities values {2, 4, 1, 5, 3} to {REQ 3, REQ 1, REQ 5, REQ 2, REQ 4}.

The arbiter 308 further comprises a fixed priority arbiter (FPA) 315 connected to the mapping logic 314. The FPA 315 may be as described with respect to the FPAs 110 and 213 of FIGS. 1 and 2A, respectively. For example, the FPA 315 may comprise a sequence of inputs and a corresponding sequence of outputs and may provide the grant on the output corresponding to the first asserted input. In this example, the mapping logic 314 is to map each received request to an input of the fixed priority arbiter 315 using the priorities stored in the plurality of cells 309-313 to order the received requests. In the illustrated example, the FPA 315 outputs a grant on its first output 319.

The arbiter 308 further comprises unmapping logic 316. The unmapping logic may be as described with respect to unmapping logic 111 of FIG. 1, including as described with respect to the unmapping logic of FIGS. 2A and 2B. The unmapping logic is to map the output on which the grant is provided to the winning client using the priorities stored in the plurality of cells. In the illustrated example, the unmapping logic 316 maps the grant on the first output 319 of the FPA to the 3$^{rd}$ client 304, which had the highest priority cell 311. In the illustrated example, the arbiter 308 provides the grant on a bus 317. In other examples, the arbiter 308 may have a point to point link from each output of the unmapping logic 316 to the corresponding client, or any other method of yielding the grant back to the winning client may be employed. The client receiving the grant may then access the shared resource 307. In the illustrated example, client 3 304 wins the grant and sends its packet over the output port 307.

The arbiter 308 further comprises sequencing logic 318. The sequencing logic 318 may be as described with respect to the sequencing logic 121 of FIG. 1, including as described with respect to the sequencing logic of FIG. 2A. The sequencing logic 318 is to update the priorities stored in the cell according to the arbitration ordering scheme applied by the arbiter 308. For example, the sequencing logic 318 may update the priorities according to an LRU ordering scheme by updating the priorities stored in the cells such that the cell corresponding to the winning client is updated to a lowest priority and each cell previously storing a priority less than the winning priority (i.e., the priority of the winning client) is updated to an incrementally higher priority.

Figure 4:
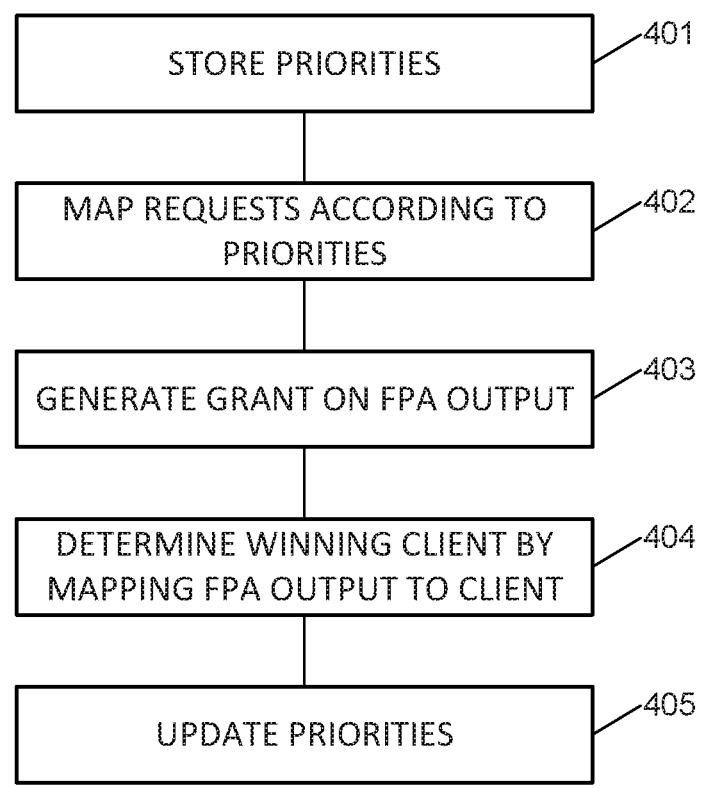
FIG. 4 illustrates a method of arbiter operation.

FIG. 4 illustrates a method of arbiter operation. For example, any of the arbiters discussed above may operate as described with respect to FIG. 4.

The method includes block 401. Block 401 includes storing a plurality of priorities for corresponding clients in a plurality of cells. For example the priorities may be stored as discussed above with respect to cells 101-104 of FIG. 1, cells 201-204 of FIGS. 2A and 2B, or cells 309-313 of FIG. 3. In one example, the priorities are stored as one hot encoded values.

The method further includes block 402. Block 402 includes mapping a plurality of requests from the clients onto a set of inputs of a fixed priority arbiter according to the corresponding priorities for the clients. For example, each cell may be connected by a signal line to each input of the fixed priority arbiter. Mapping the plurality of request onto the set of inputs may comprise each respective cell asserting a signal on the signal line connected to the input corresponding to the priority stored by the cell.

The method further includes block 403. Block 403 includes generating a grant on a winning output of the fixed priority arbiter. The winning output corresponds to a highest priority request of the plurality of requests that was mapped to a highest priority input of the set of inputs.

The method further includes block 404. Block 404 includes determining a winning client of the plurality of clients by mapping the winning output to the winning client according to the priorities of the requests. For example, block 404 may comprise using the winning output of the fixed priority arbiter to control a multiplexer, where the multiplexer is connected to the plurality of cells.

The method further includes block 405. Block 405 includes updating the priorities according the ordering scheme employed by the arbiter. For example, block 405 may include updating the priorities such that the winning priority of the winning client is set to a lowest priority and each other priority less than the winning priority is updated to an incrementally higher priority. In one example, block 405 may comprise sending the winning priority to each cell and each cell updating its priority based on the winning priority. For example, each cell may compare its current priority to the winning priority and updating its current priority if it is equal to or lower than the winning priority.

As another example, block 405 may include determining which cells to update and sending signals to the cells that will be updated. For example, block 405 may include sending a lowest priority update signal to the winning cell, the lowest priority update signal causing the winning cell to set its priority to a lowest value. In this example, block 405 may comprise sending an increment priority signal to the cells having a lower priority than the winning priority, where the increment signal causes the receiving cells to incrementally increase their priorities.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. An arbiter, comprising:
a plurality of cells, each cell connected to a corresponding client, configured to store a priority for the corresponding client, comprising a plurality of output lines equal in number to the plurality of cells, and to output its stored priority as a one hot encoded signal onto its plurality of output lines if it receives a request from its corresponding client;
mapping logic comprising a plurality of OR gates equal in number to the plurality of cells, each OR gate comprising a plurality of input ports equal in number to the plurality of cells, connected to the plurality of cells such that the ith output line of each cell is connected to the ith OR gate to order requests received from the clients according to the priorities stored in the cells;
a fixed priority arbiter to receive the ordered requests and to generate a grant for a winning request of the requests; and
unmapping logic to use the stored priorities to yield the grant back to the winning client that sent the winning request; wherein
each OR date comprises an output,
the fixed priority arbiter comprises a plurality of inputs equal in number to the plurality of cells,
the outputs of the OR gates are connected to the inputs of the fixed priority arbiter such that the output of an ith OR gate is connected to the ith input of the fixed priority arbiter;
the fixed priority arbiter comprises a plurality of outputs equal in number to the plurality of cells; and
the unmapping logic comprises a multiplexer comprising:
a plurality of inputs equal in number to the number of cells, each input comprising a plurality of input lines equal in number to the number of cells, wherein the output lines are connected to the input lines such that the ith output line of a ith cell is connected to the ith input line of the ith multiplexer input;
an output comprising a plurality of output lines equal in number to the plurality of cells;
a plurality of select lines connected to the plurality of outputs of the fixed priority arbiter such that the outputs of the fixed priority arbiter one-hot encode which multiplexer input is copied to the multiplexer output.

2. The arbiter of claim 1, wherein each output line of the multiplexer is connected to one of the clients such that the ith output line is connected to the ith client, and the grant is carried on one of the output lines.

3. The arbiter of claim 2, wherein:
each output line of the fixed priority arbiter is connected to each of the cells;
the outputs of the fixed priority arbiter one-hot encode a winning priority of the winning client; and
each cell is to update its priority based on its current priority and the winning priority.

4. The arbiter of claim 3, wherein each cell is to update its priority by setting its priority to a lowest priority if its current priority is equal to the winning priority and incrementally increasing its priority if its current priority is less than the winning priority.

5. The arbiter of claim 1, further comprising:
sequencing logic to update the priorities stored in the cells such that the cell corresponding to the winning client is updated to a lowest priority and each cell previously storing a priority less than a winning priority is updated to an incrementally higher priority,
wherein the winning priority is the priority of the cell corresponding to the winning client.

6. The arbiter of claim 5, wherein each respective cell comprises a portion of the sequencing logic, each respective portion of the sequencing logic to update the respective priority of the respective cell based on the winning priority.

7. The arbiter of claim 5, wherein the unmapping logic is to provide the winning priority to the plurality of cells.

* * * * *